US006366569B1

(12) United States Patent
Ritter

(10) Patent No.: US 6,366,569 B1
(45) Date of Patent: Apr. 2, 2002

(54) METHOD AND BASE STATION FOR TRANSMITTING DATA OVER A RADIO INTERFACE IN A RADIO COMMUNICATIONS SYSTEM

(75) Inventor: Gerhard Ritter, Thaining (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/562,348

(22) Filed: Apr. 27, 2000

Related U.S. Application Data

(63) Continuation of application No. PCT/DE98/03064, filed on Oct. 20, 1998.

(30) Foreign Application Priority Data

Oct. 27, 1997 (DE) .......................................... 197 47 367

(51) Int. Cl.[7] .................................................. H04J 3/06
(52) U.S. Cl. ...................................... 370/337; 375/231
(58) Field of Search ................................ 370/328, 345, 370/280, 294, 321, 337, 347, 442, 513, 514, 491, 320, 342, 441, 479; 375/231

(56) References Cited

U.S. PATENT DOCUMENTS

| | | |
|---|---|---|
| 4,233,473 A | 11/1980 | Frost |
| 4,688,210 A | 8/1987 | Eizenhöfer et al. |
| 4,765,753 A | 8/1988 | Schmidt |
| 4,949,395 A | 8/1990 | Rydbeck |
| 5,182,753 A | 1/1993 | Dahlin et al. |
| 5,212,803 A * | 5/1993 | Uddenfeldt et al. ....... 455/33.1 |
| 5,297,165 A | 3/1994 | Ueda et al. |
| 5,381,443 A | 1/1995 | Borth et al. |
| 5,548,812 A | 8/1996 | Padovani et al. |
| 5,584,049 A | 12/1996 | Weaver et al. |
| 5,594,720 A | 1/1997 | Papadopoulos et al. |
| 5,598,417 A | 1/1997 | Crisler et al. |
| 5,642,354 A | 6/1997 | Spear |
| 5,655,003 A | 8/1997 | Erving et al. |
| 5,850,393 A * | 12/1998 | Adachi ........................ 370/335 |
| 5,854,784 A * | 12/1998 | Solve et al. ................. 370/311 |
| 5,898,929 A * | 4/1999 | Haartsen ..................... 455/462 |
| 6,002,716 A * | 12/1999 | Meyer et al. ................ 375/231 |
| 6,069,884 A * | 5/2000 | Hayashi et al. ............. 370/335 |
| 6,144,860 A * | 11/2000 | Kowatsu ..................... 455/522 |
| 6,163,570 A * | 11/2000 | Olafsson ..................... 375/223 |
| 6,175,558 B1 * | 1/2001 | Miya .......................... 370/335 |

FOREIGN PATENT DOCUMENTS

| | | |
|---|---|---|
| EP | 0 519 891 A2 | 12/1992 |
| EP | 0 715 440 A1 | 6/1996 |
| EP | 0 767 557 A1 | 4/1997 |
| EP | 0 767 594 A2 | 4/1997 |

OTHER PUBLICATIONS

Published International Application No. WO 96/27975 (Räsänen), dated Sep. 12, 1996.
Published International Application No. WO 96/35306 (Munday et al.), dated Nov. 7, 1996.
Published International Application No. WO 97/08861 (Terayon), dated Mar. 6, 1997.
"GSM–Funkschnittstelle, Elemente und Funktionen" (Smolka), dated Apr. 1993, Telekom Praxis, pp. 17–24, pertains to a GSM radio interface, elements and functions, as mentioned on p. 2 of the specification.

* cited by examiner

Primary Examiner—Douglas Olms
Assistant Examiner—Ken Vanderpuye
(74) Attorney, Agent, or Firm—Herbert L. Lerner; Laurence A. Greenberg; Werner H. Stemer

(57) ABSTRACT

The invention relates to a method and a base station for transmitting data in a downlink direction over a radio interface in a mobile radio communications system. The base station transmits the data in the downlink direction to a radio station in radio blocks that are organized in a time division multiplex method. Recurring training sequences are inserted between the radio blocks without decreasing the transmission power used for transmitting the data. The radio station carries out a channel estimation by means of the training sequences.

9 Claims, 5 Drawing Sheets

METHOD AND BASE STATION FOR TRANSMITTING DATA OVER A RADIO INTERFACE IN A RADIO COMMUNICATIONS SYSTEM

CROSS-REFERENCE TO RELATED APPLICATION

This is a continuation of copending international application PCT/DE98/03064, filed Oct. 20, 1998, which designated the United States.

BACKGROUND OF THE INVENTION

Field of the Invention

The invention lies in the telecommunications field. More specifically, the invention relates to a method and a configuration for transmitting data via a radio interface in a radio communications system, in particular in a mobile radio system.

In radio communications systems, messages (for example voice, image information, or other data) are transmitted using electromagnetic waves. The electromagnetic waves are thereby radiated at carrier frequencies which lie in the frequency band that is provided for the respective system. In the GSM (Global System for Mobile Communications), the carrier frequencies lie in the 900 MHz range. For future radio communications systems, for example the UMTS (Universal Mobile Telecommunication System) or other $3^{rd}$ generation systems, frequencies in the approximately 2 GHz frequency band are provided.

The irradiated electromagnetic waves are attenuated owing to losses resulting from reflection, refraction and irradiation due to the curvature of the earth and the like. As a result, the reception power which is available at the receiving radio station drops. The attenuation is location-dependent and, in the case of moving radio stations, also time-dependent.

Between a transmitting and a receiving radio station there is a radio interface over which data is transmitted using the electromagnetic waves. In the GSM mobile radio system, subscriber separation is carried out using a time division multiplex method, the so-called TDMA (Time Division Multiple Access) method which is used in combination with a frequency division multiplex method FDMA (Frequency Division Multiple Access).

In the GSM mobile radio system as is known, inter alia, from J. Biala, "Mobilfunk und intelligente Netze" [Mobile Radio and Intelligent Networks], Vieweg Verlag [publishing house], 1995 in particular pages 80 and 269, and from P. Smolka "GSM-Funkschnittstelle—Elemente und Funktionen [GSM Radio Interface—Elements and Functions]" telekom praxis, No. 4/93, pp. 17–24, in particular FIGS. 4 and 5, a TDMA frame is divided into 8 timeslots. Data from communications links and/or signaling information is transmitted as radio blocks, so-called bursts, in the timeslots. Midambles with known symbols are transmitted within a radio block. These midambles can be used in the manner of training sequences for receive-end tuning of the radio station. The receiving radio station uses the midambles to estimate the channel pulse responses for various transmission channels. Because the transmission properties of the mobile radio channel are location-dependent and frequency-dependent, the receiving radio station can equalize the received signal using this training sequence.

The TDMA subscriber separation method used in the GSM mobile radio system has been developed and dimensioned for the transmission of information with a relatively low data rate. It also has a very restricted degree of flexibility when allocating data rates to a subscriber.

However, in future radio communications systems, and in particular third generation mobile radio systems, high data rates and individual, flexible allocation of transmitter capacities to communications links are desired. Furthermore, mixed operation of different services and data rates and asymmetry of the data rates and of the traffic volume such as, for example, the downlink and uplink (reverse and forward directions) in Internet applications are to be supported.

International PCT publication WO 97/08861 (see U.S. Pat. Nos. 5,768,269 and 5,793,759) discloses an configuration and a method for the bidirectional transmission of digital data over different transmission media. Here, data from a plurality of sources are subjected to a time division multiplex process in timeslots and to coding using orthogonal codes. The coded data are transmitted in frames between central and remote units, the frames being synchronized by means of a transmission interval without data.

European published patent application EP 0 767 557 A1 (see U.S. Pat. No. 5,838,672) discloses a time frame and timeslot structure based on a known TDMA subscriber separation method such as is used in the GSM mobile radio system described above. Here, a training sequence is embedded in a timeslot and surrounded by two data blocks.

SUMMARY OF THE INVENTION

The object of the invention is to provide a method and a configuration for data transmission via a radio interface in a radio communications system which overcomes the above-noted deficiencies and disadvantages of the prior art devices and methods of this general kind, and which enables a flexible and dynamically configurable time division multiplex structure for transmitting data in the downlink direction.

With the above and other objects in view there is provided, in accordance with the invention, a method of transmitting data over a radio interface in a mobile radio system, which comprises:

transmitting data of at least one communications link in a downlink direction from a base station to at least one radio station in radio blocks of a time division multiplex method organized in time frames;

periodically transmitting, within a time frame, training sequences and after a respective training sequence transmitting the radio block of at least one of the communications links, whereby the training sequences are transmitted with a constant transmission power higher than an average transmission power for the radio blocks.

In other words, the invention relates to a method and a base station for transmitting data in the downlink direction over a radio interface in a radio communications system. A base station transmits the data from at least one communications link in the downlink direction to a radio station in radio blocks in accordance with a time division multiplex method. Within a time frame, training sequences are transmitted in periodic fashion and after a respective training sequence the radio block of at least one of the communications links is transmitted. Here, the training sequences are transmitted with a constant transmission power which is higher than an average transmission power for the radio blocks.

This method according to the invention has the advantage that the times for the switching on and off of the transmitter and for the decay of the transmission channels are dispensed with, as a result of which the time component used for transmitting data can be increased. As a further advantage, this method permits the changes of the transmission properties on the radio link to be continuously detected by means of the radio station, and permits the radio station to carry out equalization of the received signals so that, for example, transmission of data is made possible even at higher speeds of the radio station which is embodied as a mobile station of a mobile radio system.

The fact that the training sequences at the transmitting base station end are transmitted with a constant transmission power which is greater than the average transmission power for the data enables the radio station to make precise channel estimations regarding the transmission properties independently of the location and of the power regulation for other radio stations whose data are transmitted in the same radio block or in other radio blocks between the training sequences. In addition, the higher transmission power results in an improvement of the average signal-to-noise ratio when the training sequences are received in the radio station.

In accordance with an added feature of the invention, the radio station interpolates and/or extrapolates the channel estimation from at least two training sequences. The interpolation and/or extrapolation is carried out here for all components of the multipath delay occurring during the transmission on the radio interface which can be resolved chronologically. This refinement has the advantage that the variation in the timing of the transmission properties over the radio blocks can be adjusted with the data intended for the radio station, in which case the extrapolation from the receiving radio station also enables limited predictions to be made about future transmission properties on the radio link. When there are two or more training sequences, linear interpolation and/or extrapolation are possible, whereas when there are three training sequences per timeslot quadratic interpolation and/or extrapolation can be carried out.

An advantageous adjustment of the equalization of the received signals can also be carried out permanently by means of the radio station in which these channel estimations are made on the basis of all the training sequences transmitted by the base station and the changing transmission properties on the radio link are detected by means of an interpolation and/or extrapolation.

In accordance with an additional feature of the invention, the data of a first communications link to the radio station and from other communications links to other radio stations are combined in a radio block. This refinement permits flexible allocation of the transmission capacity on the transmission route to the individual communications links in comparison with the rigid allocation of, in each case, one communications link to one radio block which is transmitted in an interval between two training sequences.

In addition, according to one development of this embodiment the amount of data of the respective first communications link and of the other communications links can advantageously be varied within the radio block as a function of the required transmission capacity. This permits the allocation of data rates to the individual communications links to be made flexible and dynamic, as a result of which, for example, a mixed operation with different services with different data rates or else even a mixed operation of packet-oriented and connection-oriented services is also made possible.

In addition, with such flexible and dynamic allocation of transmission capacities to communications links, in transmission pauses during the first communications link, the unused transmission capacity can be used dynamically by one or more other communications links for transmitting data, as a result of which the effective transmission capacity on the radio link is advantageously increased further.

A further increase in the transmission capacity or in the error protection can, in accordance with another feature of the invention, also be obtained by means of a shortening of the training sequences in comparison with a training sequence which is configured for a customary multipath propagation. This can be carried out, for example, as a function of the size of the radio cell or when there are only a small number of obstacles on the radio link, as a result of which the delay spread, i.e. the longest possible delay time with which a data item can unambiguously be received from the receiving radio station given multipath propagation, is significantly reduced. The transmission capacity which becomes free can in turn additionally be used for transmitting data or for error protection.

In accordance with a further feature of the invention, the data of the first communications link are provided with, in each case, one or more codes for different data sections. The code used here can be a Walsh code which is very suitable owing to its orthogonality and the simple processing of the coded signals.

A code sequence has the amplitude and the phase of a data item of a communications link applied to it, as a result of which a plurality of code sequences which are each assigned to different communications links can be transmitted simultaneously. The sum of the respective discrete time values is subsequently used to modulate the basic pulses which are to be transmitted. At the receive end, the individual received basic pulses are determined and the orthogonal code sequences are separated again by means of a code transformation. The advantage of the coding in comparison with direct transmission of the information as isolated data items (basic pulses) is that averaging of the faults over the length of code sequences occurs. To modulate the data, known forms of modulation, for example BPSK, QPSK etc. can be used.

If the basic pulses are transmitted by the base station with a fixed basic pulse repetition rate clock, the radio station can, according to a further refinement, receive and evaluate these basic pulses by means of a discontinuous transversal filter. The use of a discontinuous transversal filter also enables the basic pulses of one or more base stations which are causing interference in the surroundings of the radio station to be eliminated. In a cellular environment this permits the signal-to-noise ratio at the location of the radio station to be improved considerably.

The discontinuous transversal filter permits a receiver device to be implemented favorably in terms of expenditure. Depending on the dimensioning and the expenditure incurred on the transversal filtering, the method is significantly better for compensating transmission distortions which have previously been taken into account only approximately.

For the transmission it is possible to use, on principle, any desired basic pulses such as Gaussian or chronologically limited sin(x)/x-shaped basic pulses and/or bandwidth-increasing basic pulses which, in the simplest case, are constructed from a train of simple basic pulses.

With the above and other objects in view there is also provided, in accordance with the invention, a base station in a mobile radio communications system wherein data are transmitted over a radio interface in the mobile radio communications system. The data of at least one communications link are transmitted in a downlink direction to at least one radio station in radio blocks of a time division multiplex method organized in time frames. The improved base station comprises:

a device programmed to periodically insert training sequences into a respective time frame, the training sequences being transmitted with a constant transmission power which is higher than an average transmission power for the radio blocks; and a transmitter device for transmitting the radio block of at least one of the communications links following a respective training sequence.

Other features which are considered as characteristic for the invention are set forth in the appended claims.

Although the invention is illustrated and described herein as embodied in a method and configuration for transmitting data over a radio interface in a radio communications system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
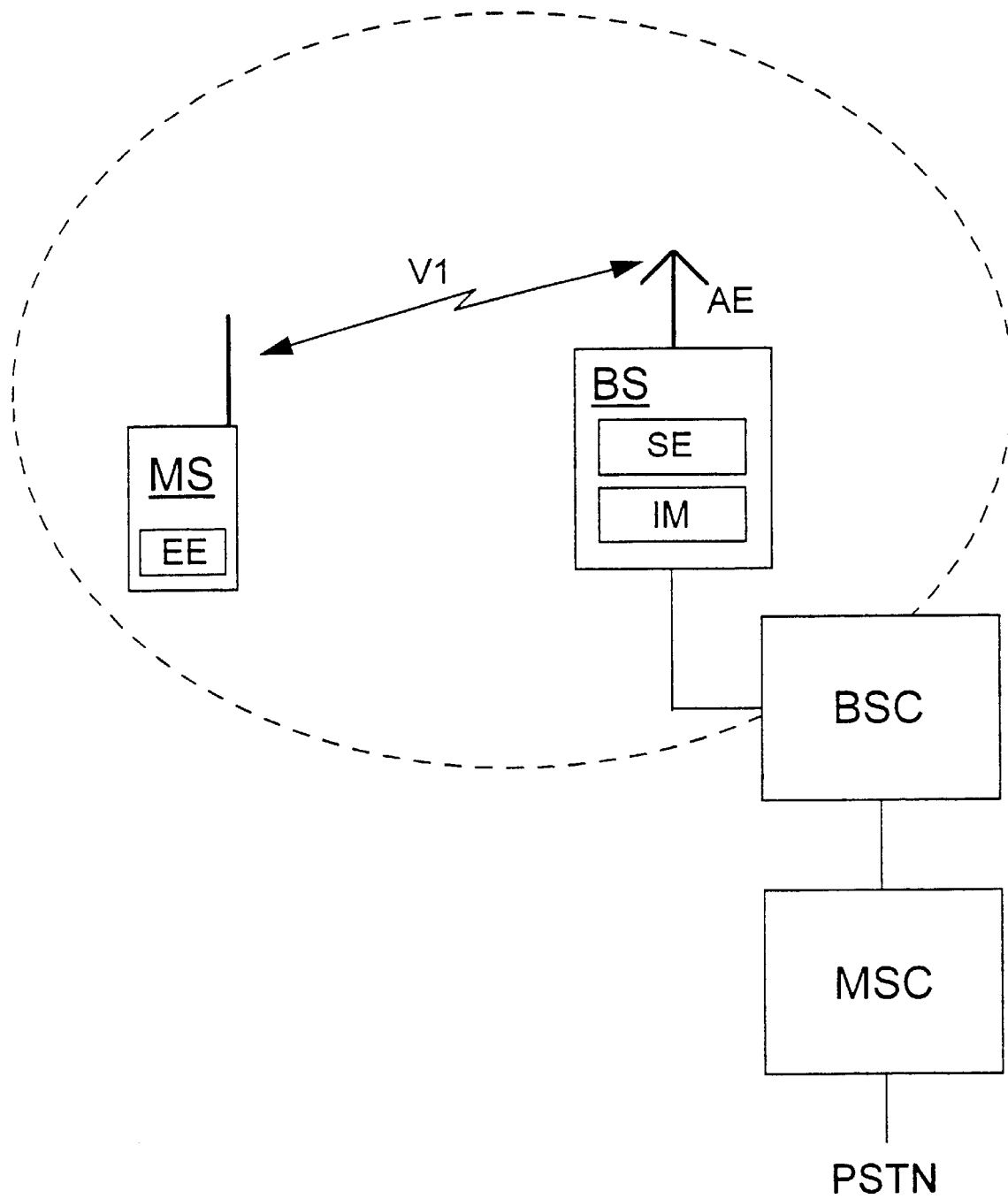
FIG. 1 is a block diagram of a radio communications system, in particular of a mobile radio system.

Referring now to the figures of the drawing in detail and first, particularly, to FIG. 1 thereof, there is seen a radio communications system that corresponds in its basic structure to a conventional GSM mobile radio network. The network includes a multiplicity of mobile switching centers MSC which are networked to one another and/or provide access to a fixed network PSTN. The mobile switching centers MSC are each connected to at least one base station controller BSC. Each base station controller BSC permits, in turn, connection to at least one base station BS. The base stations BS are radio stations which can set up communications links to radio stations MS (a mobile radio station) over a radio interface. The functionality of this structure is used by the radio communications system according to the invention.

There is illustrated in FIG. 1 a first exemplary communications link V1 for the transmission of useful data and signaling information between a mobile radio station MS and a base station BS. The base station BS is connected to an antenna device AE which is composed, for example, of three individual radiators. Each of the individual radiators radiates directionally into a sector of the radio cell which is supplied by the base station BS. However, alternatively, a relatively large number of individual radiators (as in adaptive antennas) can also be used so that a spatial subscriber separation according to an SDMA (Space Division Multiple Access) method can also be used.

A transmitter device SE for transmitting data d to the radio station MS and means IM for inserting recurring training sequences tseq between radio blocks fb with the data d are implemented in the base station BS. On the other hand, in the radio station MS a receiver device EE is implemented, the radio station MS using the receiver device EE to carry out a channel estimation by means of the training sequences tseq.

Figure 2:
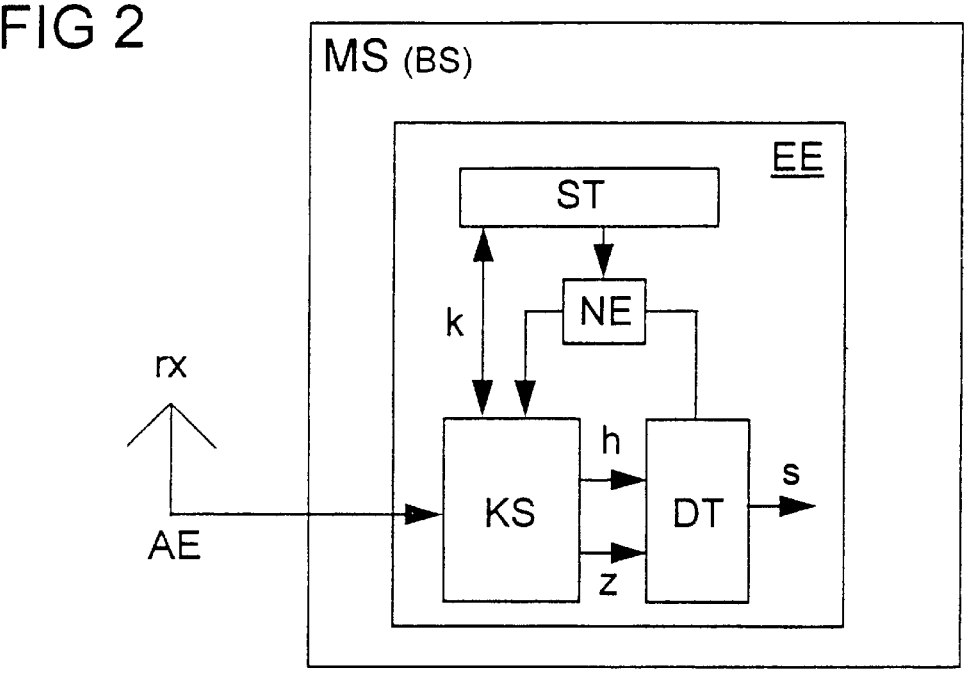
FIG. 2 is a schematic block diagram of a radio station with components for the reception path which are implemented therein.

The exemplary structure of the radio station MS is illustrated in FIG. 2, only the components which are relevant to the reception path being illustrated in the receiver device EE. However, there is of course a dual traffic relationship, i.e. the base BS and the radio station MS each have, as it were, a receiver device EE and a transmitter device SE for transmitting the data d.

Received signals rx, which arrive impaired by multipath propagation, interference and delay, are received via an antenna device AE and fed to the receiver device EE. In the receiver device EE, digital signals are generated from the received signals rx, for example by transmitting them into the baseband and subsequent analog/digital conversion. The digital signals are fed to a channel estimator KS. The channel estimator KS is connected to a detector DT and feeds to the latter antenna data z which is derived from the digital received signals rx and channel coefficients h which are determined in the channel estimator KS. The detector DT, which is embodied, for example, as a Viterbi detector, performs equalization and data detection of the antenna data z using the channel coefficients h and generates symbols s which are fed to further devices of the receiver device EE. In these further devices, decoding and, if appropriate, further processing operations are subsequently carried out. The symbols s represent the reconstructed signals of the transmit end.

A control device ST is connected to the channel estimator KS and evaluates correlation values k which are generated during the channel estimation and which form the basis for the determination of the channel coefficients h. Depending on this evaluation, the channel estimation is controlled in such a way that values determined by the detector DT are optionally included in the channel estimation by means of an adjustment unit NE.

The transmitter device SE in the base station BS transmits modulated basic pulses over a transmission channel to the receiver arrangement EE which determines system basic pulse responses and detects the data d contained in the modulation in a signal processing operation.

Figure 2A:
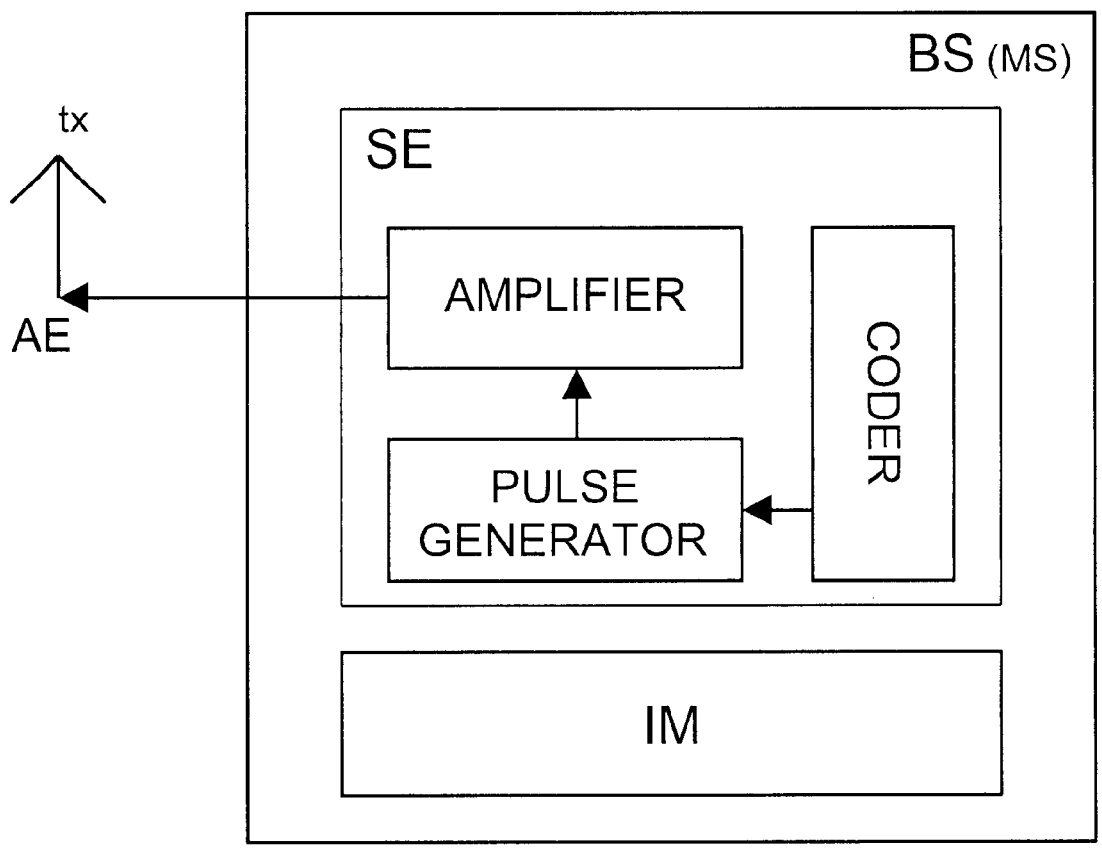

With reference to the simplified diagrammatic illustration in FIG. 2A, the transmitter device SE is composed of a coder, a basic pulse generator, a power amplifier and a means of connection to the transmission medium, which transmits at the antenna device AE. The transmitter device SE generates basic pulses with a specific basic pulse repetition rate clock. The basic pulses are passed on to the antenna device AE via the power amplifier. In a coder, as a function of the data d which is to be transmitted, the basic pulse which will be emitted is selected from a supply of available basic pulses, and the modulation factor with which this basic pulse will be modified is selected.

Different transmission methods differ in terms of the supply of basic pulses. One or more basic pulses can be used for this. These basic pulses can have any desired chronological extent and are not defined in terms of the time period of the basic pulse repetition rate clock.

The following signal processing: amplification, frequency conversion, analog filtering, A/D conversion and digital filtering takes place in the receiver. At the output of the digital filtering means a train of system basic pulse responses is produced with the clock of the basic pulse repetition rate clock. This train of superimposed system basic pulse responses is fed to the signal processing and detection means.

In the receive-end signal processing means, the system basic pulse responses are determined, the filter coefficients for at least one transversal filter are determined during the evaluation of measurement trains, data-carrying parts of the sampled values are detected in a single-stage or multi-stage transversal filter and the results of the output of the transversal filter are decoded.

Figure 3:
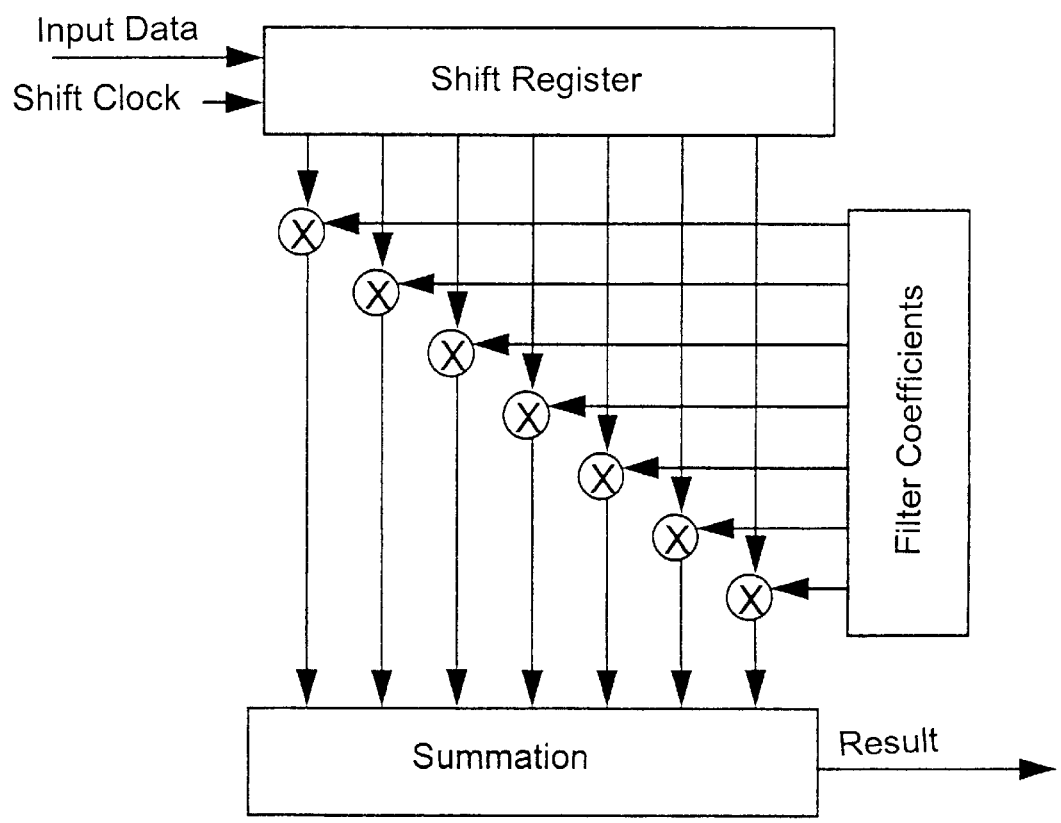
FIG. 3 is a block schematic of a discontinuous transversal filter.

A discontinuous transversal filter according to FIG. 3 is used to process the sampled values of the data-carrying parts. The transversal filter is operated discontinuously because the system basic pulse responses are sampled at a higher clock rate than the basic pulse repetition rate clock. After a filter operation, the shift register is reclocked by a number of sampled values corresponding to the oversampling of the system basic pulse responses, with the result that the sampled values are offset by one basic pulse repetition cycle. The individual sampled values which are stored in the shift register are evaluated and are summed with the specific filter coefficients. The result of the summation is a sequence of the complex modulation factors which are applied to the basic pulses at the transmission end. The result at the output of the discontinuously processing transversal filter is the sequence of modulation factors which are applied to successive basic pulses in the transmitter. Corresponding to the coding at the transmit end, these values now have to be decoded at the receive end. This can be carried out, for example, by a BPSK, QPSK, GMSK etc. whose significance can also be tied to a selection of the basic pulses.

Figure 4:
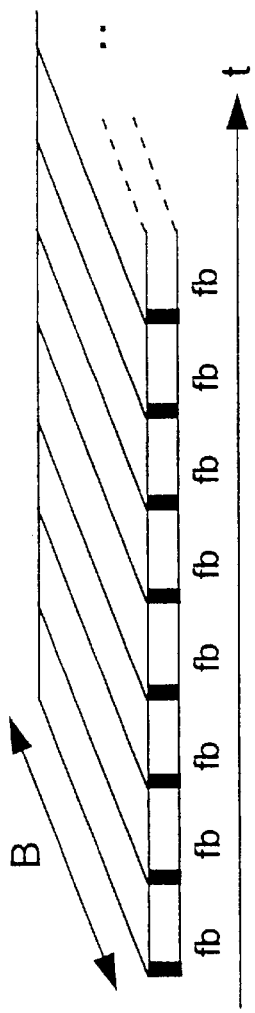
FIG. 4 is a schematic representation of a structure of a time division multiplex method.

With reference to FIG. 4, there is seen the structure of an exemplary radio interface. In each case a frequency range is divided into a plurality of radio blocks fb using a time division multiplex method. Each radio block fb forms a frequency channel within the frequency range B. Within the frequency channels which are provided for data transmission, information of a plurality of links is transmitted in radio blocks. In addition, a plurality of frequency ranges B are assigned to the radio communications system in accordance with an FDMA (Frequency Division Multiple Access) component.

Figure 5:
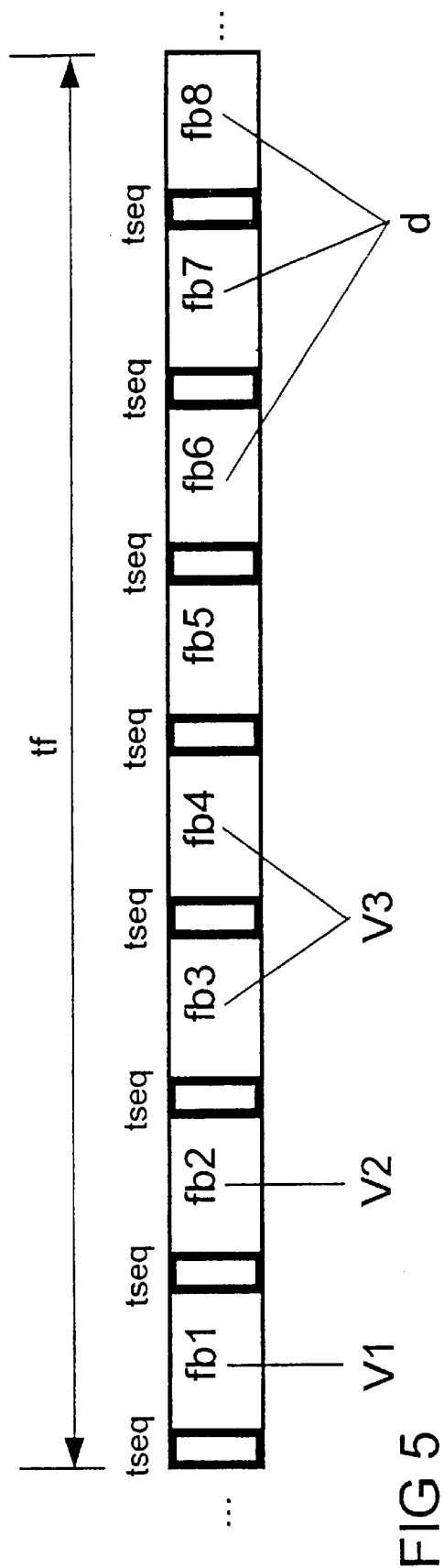
FIG. 5 is a schematic representation of an inventive frame structure of a time division multiplex method.

With reference to FIG. 5, the successive radio blocks fb within a frequency range B can be divided up according to a frame structure. Thus, for example eight radio blocks fb1 to fb8 are combined to form a time frame tf, a specific radio block fb of the time frame tf forming a frequency channel for data transmission and being able to be used reciprocally by one or more communications links. Further frequency channels, for example for frequency or time synchronization of the radio stations MS, are not introduced in each time frame tf, but rather at predefined time points within a multiframe which is superordinate on the time frames tf. The distances between these frequency channels determine the capacity which the radio communications system makes available for them.

Training sequences tseq are arranged periodically in the time frame tf in FIG. 5. The radio blocks fb1 to fb8 with data d transmitted in them are arranged between the training sequences tseq so that each training sequence tseq is followed by a radio block fb1 to fb8. This arrangement contrasts with the arrangement of the training sequences in a time frame of a GSM mobile radio system which operates according to a TDMA subscriber separation method and in which in each case one training sequence is arranged symmetrically in one radio block. By means of the training sequences tseq, the radio station MS determines the transmission conditions on the radio interface and uses the configuration described with reference to FIG. 2 to carry out equalization of the data d transmitted according to FIG. 1 in the first communications link V1 in the first radio block fb1.

The arrangement according to the invention of the training sequences tseq and of the radio blocks fb1 to fb8 has, inter alia, the above-mentioned advantage that the receiving radio station MS can easily access a plurality of training sequences tseq in order to determine the transmission conditions on the radio link. This access to a plurality of training sequences tseq can be further simplified by the fact that the training sequences tseq are transmitted by the base station BS with a higher transmission power than the data d in the radio blocks fb1 to fb8. Such, for example, permanent "monitoring" of the transmission conditions on the radio interface is not possible in the GSM mobile radio system because the training sequences embedded in the radio blocks are transmitted with the same transmission power as the data d in the radio blocks fb. Due to a different regulation of the transmission power in the radio blocks fb, which is carried out as a function of the location of the respective radio stations MS, messages of the radio station MS which were based on a plurality of training sequences tseq in radio blocks fb with communications links to other radio stations for a channel estimation would be falsified.

Figure 6:
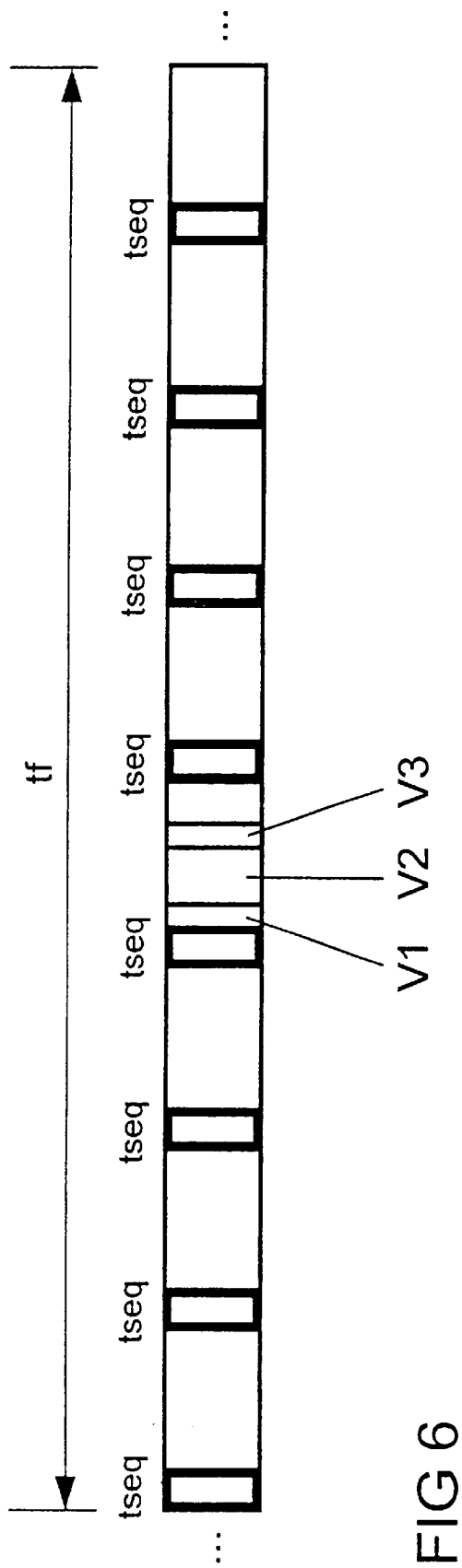
FIG. 6 is a schematic representation of a frame structure according to the invention.
Figure 7:
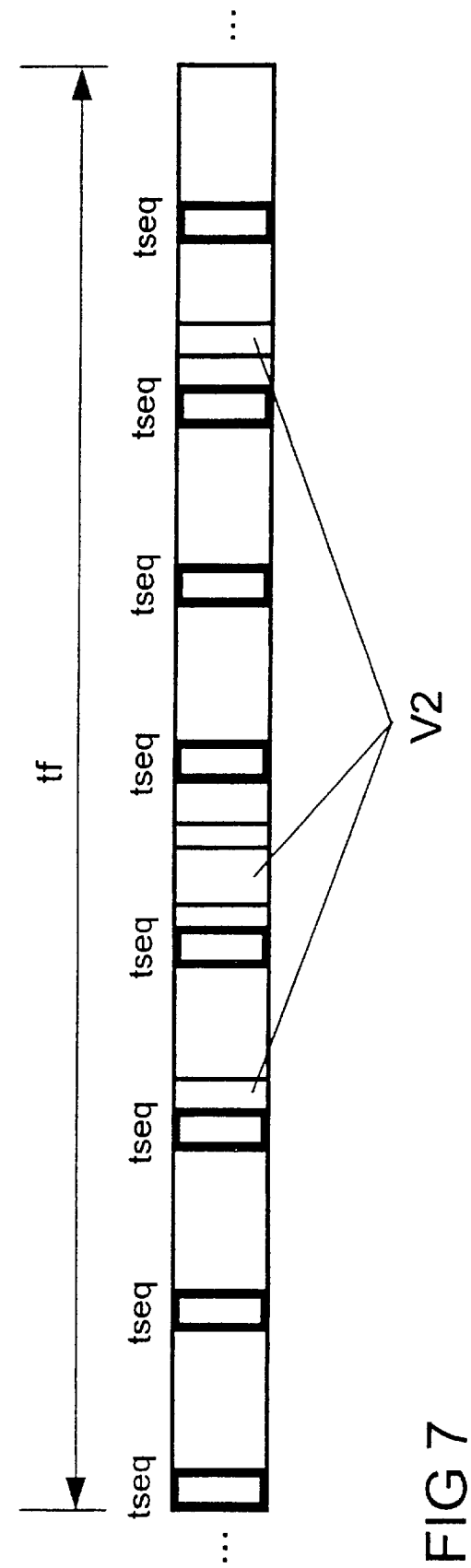
FIG. 7 is a schematic representation of a frame structure according to the invention.

FIGS. 5, 6 and 7 illustrate three different exemplary configuration possibilities for the allocation of communications links to radio blocks fb. In FIG. 5, there are three communications links V1, V2 and V3 indicated, which lead from the radio station MS and from a plurality of other radio stations MS. Each communications link V1, V2 and V3 can be assigned one or more radio blocks fb1 to fb8 for the transmission of data d. In the example illustrated in FIG. 5, the communications links V1 and V2 are each allocated a complete radio block fb1 and fb2, respectively, while the data d of the communications link V3 is transmitted in two radio blocks fb3 and fb4 in the time frame tf.

FIG. 6 presents the next configuration possibility. Here, the radio blocks fb1 to fb8 are not rigidly allocated to just one of the communications links V1, V2, V3, but rather data d of a plurality of communications links V1, V2, V3 are transmitted in one time frame tf each in a radio block fb1 to fb8. As is clear from the drawing, the respective data rate, i.e. the amount of data d which is made available to the communications links V1, V2, V3, can also vary here. The communications link V2 is allocated, for example, a higher data rate than the communications links V1 and V3. Such allocation can occur differently in accordance with the transmission capacity required in the time frames tf for the uplink (forward) and downlink (reverse) directions.

If, for example, an Internet application in which the data d are transmitted in the form of data packets is used by a subscriber on the communications link V2, as a rule a much higher data rate for the transmission of data packets is required on the downlink from the base station BS to the radio station MS than on the uplink, with the result that this communications link V2 must accordingly be allocated a much higher data rate on the downlink than in the uplink direction. In contrast, in the case of connection-oriented communications links, for example voice transmission during a telephone call, identical data rates are required in the downlink and uplink directions, with the result that the allocation within a radio block fb in the time frames tf can be orthogonal for the uplink and downlink.

In the case of packet data transmission, and also in the case of a connection-oriented communications link, it is possible, according to the invention, for pauses in the transmission of the first communications link V1, which last, for example, one or more time frames tf, to be used to transmit data d of the other communications links V2 and V3 dynamically in the radio block or radio blocks fb1 to fb8 which have become completely or partially free.

Finally, FIG. 7 shows a further configuration possibility of the allocation of the communications link V2 to the radio blocks fb1 to fb8. Here, the data d of the communications link V2 are transmitted not only in a radio block fb but also in a plurality of radio blocks fb3, fb4 and fb7. The arrangement of the data d which are associated with the communications link V2 within the radio blocks fb3, fb4 and fb7 can be implemented flexibly here at different locations and with different capacities.

I claim:

1. A method of transmitting data over a radio interface in a mobile radio system, which comprises:

transmitting data of at least one communications link in a downlink direction from a base station to at least one radio station in radio blocks of a time division multiplex method organized in time frames;

periodically transmitting, within a time frame, training sequences and after a respective training sequence transmitting the radio block of at least one of the communications links, whereby the training sequences are transmitted with a constant transmission power higher than an average transmission power for the radio blocks.

2. The method according to claim 1, which comprises selectively interpolating and extrapolating a channel estimation from at least two training sequences with the radio station.

3. The method according to claim 1, which comprises combining in a radio block the data of a first communications link to the radio station and from other communications links to other radio stations.

4. The method according to claim 3, which comprises varying an amount of data of the respective first communications link and of the other communications links within a radio block in dependence on a required transmission capacity.

5. The method according to claim 3, which comprises, in transmission pauses during the first communications link, dynamically utilizing an unused transmission capacity in a radio block by one or more other communications links for transmitting data.

6. The method according to claim 1, which comprises shortening a length of the training sequences in each case in comparison with a training sequence configured for a customary multiple propagation, and additionally utilizing a transmission capacity freed up by shortening the training sequences for one of transmitting the data and for error protection.

7. The method according to claim 1, which comprises transmitting the training sequences simultaneously on all frequency channels of the radio interface.

8. The method according to claim 1, which comprises providing each different data sections of the data of the first communications link with at least one code.

9. In a mobile radio communications system with a base station for transmitting data over a radio interface in the mobile radio communications system, wherein the data of at least one communications link are transmitted in a downlink direction to at least one radio station in radio blocks of a time division multiplex method organized in time frames, an improved base station comprising:

a device programmed to periodically insert training sequences into a respective time frame, the training sequences being transmitted with a constant transmission power which is higher than an average transmission power for the radio blocks; and a transmitter device for transmitting the radio block of at least one of the communications links following a respective training sequence.

* * * * *